(12) United States Patent
Intagliata

(10) Patent No.: US 9,924,085 B2
(45) Date of Patent: Mar. 20, 2018

(54) APPARATUS AND METHOD FOR DISABLING A DRIVER FACING CAMERA IN A DRIVER MONITORING SYSTEM

(71) Applicant: Bendix Commercial Vehicle Systems LLC, Elyria, OH (US)

(72) Inventor: Jon D Intagliata, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 160 days.

(21) Appl. No.: 14/682,154

(22) Filed: Apr. 9, 2015

(65) Prior Publication Data

US 2016/0301842 A1   Oct. 13, 2016

(51) Int. Cl.
| | | |
|---|---|---|
| H04N 9/47 | (2006.01) | |
| H04N 5/232 | (2006.01) | |
| B60R 1/00 | (2006.01) | |
| G06K 9/00 | (2006.01) | |
| G06T 7/20 | (2017.01) | |
| H04N 7/18 | (2006.01) | |

(52) U.S. Cl.
CPC ............. *H04N 5/232* (2013.01); *B60R 1/00* (2013.01); *G06K 9/00798* (2013.01); *G06K 9/00805* (2013.01); *G06K 9/00845* (2013.01); *G06T 7/20* (2013.01); *H04N 7/183* (2013.01); *B60R 2300/404* (2013.01); *G06T 2207/10016* (2013.01); *G06T 2207/30196* (2013.01); *G06T 2207/30268* (2013.01)

(58) Field of Classification Search
CPC ................................. A61B 1/041; H04N 7/18
See application file for complete search history.

(56) References Cited

U.S. PATENT DOCUMENTS

| | | | |
|---|---|---|---|
| 6,351,698 B1 * | 2/2002 | Kubota | ............... B60R 16/0231 340/988 |
| 6,701,231 B1 | 3/2004 | Borugian | |

(Continued)

OTHER PUBLICATIONS

International Searching Authority, "International Search Report and Written Opinion," dated Jun. 22, 2016, 10 pages, European Patent Office, Rijswijk Netherlands.

(Continued)

*Primary Examiner* — Chikaodili E Anyikire
(74) *Attorney, Agent, or Firm* — Cheryl L. Greenly; Brian E. Kondas; Eugene E. Clair

(57) ABSTRACT

Various examples of a driver monitoring apparatus and a method of disabling a driver facing camera are disclosed. A driver monitoring controller receives video images of a driver and transmits control messages to a driver facing camera. The driver monitoring controller receives a signal indicating that the driver desires to disable the driver facing camera. The driver monitoring controller receives messages indicating a vehicle state. The control logic of the driver monitoring controller disables the driver facing camera by transmitting a control message to disable the driver facing camera in response to a control input indicating the driver desires to disable the driver facing camera and a vehicle state message indicating a vehicle state does not meet a predetermined condition. The control logic of the driver monitoring controller enables the camera automatically in response to a vehicle state message indicating the vehicle state meets the predetermined condition.

2 Claims, 3 Drawing Sheets

(56) References Cited

U.S. PATENT DOCUMENTS

| | | |
|---|---|---|
| 7,116,803 B2 | 10/2006 | Lemelson |
| 7,119,696 B2 | 10/2006 | Borugian |
| 7,129,838 B2 | 10/2006 | Shimomura |
| 7,355,628 B2 | 4/2008 | Matko |
| 7,602,947 B1 | 10/2009 | Lemelson |
| 7,656,294 B2 | 2/2010 | Boss |
| 8,103,412 B2 | 1/2012 | Miller |
| 8,131,429 B2 | 3/2012 | Plaster |
| 8,466,781 B2 | 6/2013 | Miller |
| 8,576,061 B2 | 11/2013 | Miller |
| 8,810,383 B2 | 8/2014 | Lippman |
| 2002/0001398 A1* | 1/2002 | Shimano .............. G06K 9/6293 382/104 |
| 2007/0008082 A1 | 1/2007 | Nicholas |
| 2007/0086624 A1* | 4/2007 | Breed ................ G06K 9/00362 382/104 |
| 2007/0088488 A1 | 4/2007 | Reeves |
| 2009/0261979 A1* | 10/2009 | Breed ..................... B60J 10/00 340/576 |
| 2011/0025848 A1* | 2/2011 | Yumiba .................... B60R 1/00 348/148 |
| 2012/0242819 A1 | 9/2012 | Schamp |
| 2013/0151027 A1 | 6/2013 | Petrucci |
| 2013/0311043 A1* | 11/2013 | Kobana ..................... B60J 7/22 701/41 |
| 2013/0332004 A1 | 12/2013 | Gompert |
| 2014/0019167 A1* | 1/2014 | Cheng .................. G06Q 40/08 705/4 |
| 2014/0146152 A1 | 5/2014 | Frashure |
| 2014/0226010 A1 | 8/2014 | Molin |
| 2014/0300739 A1* | 10/2014 | Mimar .................. H04N 7/188 348/148 |

OTHER PUBLICATIONS

Lytx Inc., "DriveCam Installation", Installation Instructions, 2014, 8 pages, United States.
Bendix Commercial Vehicle Systems LLC, SD-64/4976 "AutoVue Lane Departure Warning (LDW) System by Bendix CVS," Service Data Sheet, Nov. 2014, 16 pages, United States.

* cited by examiner

APPARATUS AND METHOD FOR DISABLING A DRIVER FACING CAMERA IN A DRIVER MONITORING SYSTEM

BACKGROUND

The present invention relates to examples of a driver monitoring apparatus and method for disabling a driver facing camera. A driver facing camera may be mounted in the cab of the vehicle to monitor the driver and/or passengers. Generally, the camera is powered on as soon as the vehicle is powered on and stays on as long as the driver monitoring system to which it is connected is also powered on. This action requires tremendous amounts of video storage capability. In addition, having the video camera on while the vehicle is powered may also cause driver privacy issues, especially to drivers of commercial vehicles who leave the vehicles powered on even during mandatory rest breaks. There is a need for a sensible manner in which to keep driver facing cameras on to capture driver behavior, but allow the driver some autonomy to disable the camera when he or she is not actually driving the vehicle.

SUMMARY

Various examples of a driver monitoring controller comprise a camera communications port for receiving video images of a driver and transmitting control messages to a driver facing camera; a control input for receiving a signal indicating that the driver desires to disable the driver facing camera; a vehicle communications port for receiving messages indicating a vehicle state; and control logic in communication with the camera communications port, the control input and the vehicle communications port. The control logic disables the driver facing camera by transmitting a control message to disable the driver facing camera at the camera communications port in response to a control input indicating the driver desires to disable the driver facing camera and a vehicle state message indicating a vehicle state does not meet a predetermined condition; and the control logic enables the camera automatically in response to a vehicle state message indicating the vehicle state meets the predetermined condition.

Various examples of a system for monitoring a driver comprises a camera for capturing images of a driver of a vehicle; a switch associated with the camera for disabling the camera; and a driver monitoring controller in communication with the camera. The camera is disabled in response to the switch and remains disabled until enabled automatically by the driver monitoring controller in response to a signal indicating a vehicle state meets a predetermined condition.

In accordance with another aspect, a method of monitoring a driver of a vehicle comprises enabling a camera for receiving images of a driver; receiving a control input indicating the driver desires to disable the camera; disabling the camera in response to a control input and a message indicating a vehicle state does not meet a predetermined condition; and re-enabling the camera automatically in response to a message indicating the vehicle state meets the predetermined condition.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
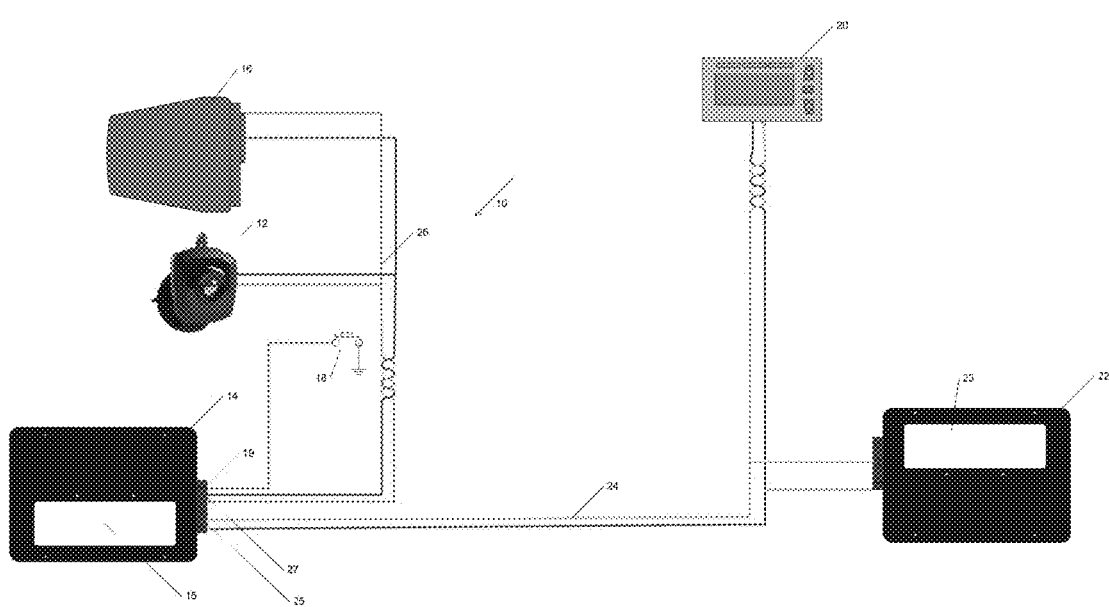
FIG. 1 illustrates a schematic representation of a driver monitoring system according to an example of the present invention.

With reference to FIG. 1, a driver monitoring system 10 is shown. The driver monitoring system 10 includes a driver monitoring controller 14. The driver monitoring controller 14 includes a camera communications port 27, a vehicle communications port 25 and a control input 19. In one example, the camera communications port 27 and the vehicle communications port 25 are the same port.

The driver monitoring controller 14 includes a processor having control logic 15 for performing the driver monitoring functions. The control logic 15 communicates with the camera communications port 27, the vehicle communications port 25 and the control input 19. The control logic 15 of the driver monitoring controller 14 receives vehicle state information via the vehicle communications port 25 and a control signal at the control input 19. The control logic 15 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 15. The driver monitoring controller 14 may be of the type used in the Autovue® Lane Departure Warning System from Bendix Commercial Vehicle Systems LLC of Elyria, Ohio.

The driver monitoring system 10 includes a forward facing camera 16. The forward facing camera 16 captures images in front of the vehicle. The forward facing camera 16 communicates images and information to the driver monitoring controller 14 using a camera communications bus 26. The driver monitoring controller 14 processes the images from the forward facing camera 16 for use in forward object detection in collision mitigation and lane departure warning systems. The driver monitoring system 10 may include any number of cameras positioned external to the vehicle.

The driver monitoring system 10 includes a driver facing camera 12. The driver facing camera 12 is mounted in such a way as to capture a view of the driver while she is in the driver's seat. The driver facing camera 12 communicates images to the driver monitoring controller 14 and receives control signals from the driver monitoring controller 14 using the camera communications bus 26. The driver monitoring controller 14 processes and records the images from the driver facing camera 12 for use in drowsy driver and collision mitigation systems. The driver monitoring controller 14 may also record the operating state of the driver facing camera 12. In one example, the driver facing camera 12 is integrated with the driver monitoring controller 14. In another example, the driver facing camera 12 is integrated with the forward facing camera 16 and may be of the type DriveCam® DC3/DC3P Video Event Recorder from Lytx, Inc. of San Diego, Calif.

The driver monitoring system 10 includes a manually operable switch 18. The manually operable switch 18 is mounted in the vehicle cab so that the driver can operate the switch 18. Alternatively, the manually operable switch 18 may be integrated with the driver facing camera 12. The driver changes the state of the switch 18 when he or she wants to disable the driver facing camera 12. The switch 18 communicates a signal to the driver monitoring controller 14 via the control input 19 to indicate when the driver desires to disable the driver facing camera 12.

The driver monitoring system 10 includes the camera communications bus 26, which connects the forward facing camera 16 and the driver facing camera 12 to the driver monitoring controller 14. The camera communications bus 26 may use a standard protocol or be a high speed direct connection to facilitate high speed image transfer to the driver monitoring controller 14.

The vehicle on which the driver monitoring system 10 is installed includes a vehicle communications bus 24. The vehicle communication bus 24 may use a protocol such as SAE J1939 to facilitate communication with other controllers on the vehicle. The driver monitoring controller 14 communicates with the vehicle communications bus 24 via the communications port 25.

The vehicle on which the driver monitoring system 10 is installed includes a safety system controller 22. The safety system controller 22 communicates with the driver monitoring controller 14 and other vehicle controllers over the vehicle communications bus 24. The safety system controller 22 includes control logic 23 for controlling anti-lock braking, vehicle stability control and active cruise control with braking. The control logic 23 also receives and transmits vehicle messages regarding vehicle speed, stability events, and/or forward vehicle detection. In one example, the functions of the driver monitoring controller 14 are incorporated into the safety system controller 22.

The vehicle on which the driver monitoring system 10 is installed may also include a dash display 20 that communicates with the driver monitoring controller 14 and safety system controller 22 on the vehicle communication bus 24. The dash display 20 communicates information from the driver monitoring controller 14 and the safety system controller 22 to the driver. Information communicated may be the operating status of the driver facing camera 12, the operating status the forward facing camera 16 and/or the detection of objects within view of the forward facing camera 16. In another example, the driver facing camera 12 includes a light or other indicator of its operating state integrated with the driver facing camera 12.

Therefore, a driver monitoring controller comprises a camera communications port for receiving video images of a driver and transmitting control messages to a driver facing camera; a control input for receiving a signal indicating that the driver desires to disable the driver facing camera; a vehicle communications port for receiving messages indicating a vehicle state; and control logic in communication with the camera communications port, the control input and the vehicle communications port. The control logic disables the driver facing camera by transmitting a control message to disable the driver facing camera at the camera communications port in response to a control input indicating the driver desires to disable the driver facing camera and a vehicle state message indicating a vehicle state does not meet a predetermined condition; and the control logic enables the camera automatically in response to a vehicle state message indicating the vehicle state meets the predetermined condition.

Figure 2:
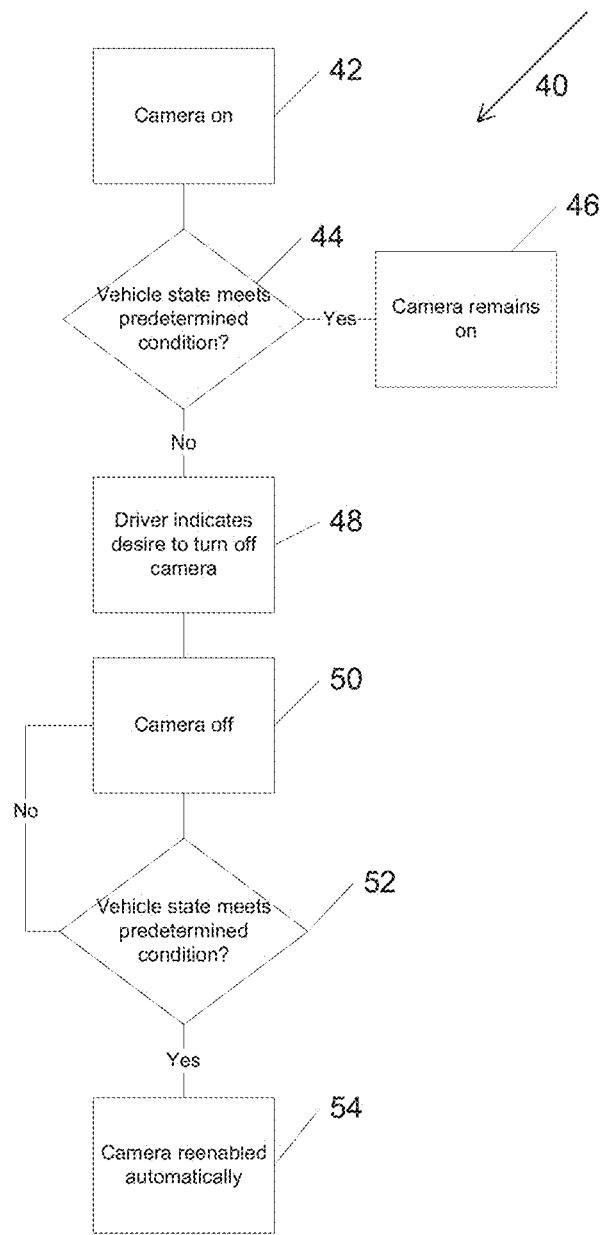
FIG. 2 illustrates a method of disabling and enabling of the driver facing camera of the driver monitoring system, according to an example of the present invention.

Therefore, a system for monitoring a driver comprises a camera for capturing images of a driver of a vehicle; a switch associated with the camera for disabling the camera; and a driver monitoring controller in communication with the camera. The camera is disabled in response to the switch and remains disabled until enabled automatically by the driver monitoring controller in response to a signal indicating a vehicle state meets a predetermined condition A flowchart for implementing a method 40 of disabling the driver facing camera 12 is shown in FIG. 2. In step 42, the driver facing camera 12 is enabled. In one example, the driver facing camera 12 is enabled by the driver monitoring controller 14 upon power up of the vehicle.

In step 44, the driver monitoring controller 14 determines if a vehicle message indicating that the vehicle state meets a predetermined condition has been received. The vehicle message may be from the safety system controller 22 as transmitted on the vehicle communications bus 24. The predetermined condition may be a vehicle speed above a predetermined speed, the detection of a forward object or the vehicle out of the lane of travel. In one example, the predetermined speed is about five miles per hour. If the vehicle state meets any one of the predetermined conditions, the camera remains on in step 46 and the driver cannot use the manual switch 18 to turn the driver facing camera 12 off. If the vehicle state does not meet any of the predetermined conditions, the method 40 continues to step 48.

In step 48, the driver turns off the driver facing camera 12 using the manual switch 18. The manual switch 18 communicates the driver's intent to disable the driver facing camera 12 to the control input 19 of the driver monitoring controller 14. In step 50 the driver monitoring controller 14 communicates a control message to the driver facing camera 12 via the camera bus 26 instructing the driver facing camera 14 to turn off. The driver facing camera 12 then turns off.

In step 52, the driver monitoring controller 14 determines if a vehicle message indicating that the vehicle state meets a predetermined condition has been received. The vehicle message may be from the safety system controller 22 as transmitted on the vehicle communications bus 24. The predetermined condition may be an occurrence of a vehicle speed above a predetermined speed, the detection of a forward object or a vehicle being out of a lane of travel. In one example, the predetermined speed is about five miles per hour. If the vehicle state does not meet any one of the predetermined conditions, the method 40 returns to step 50 and the driver facing camera 12 remains off.

If the vehicle state meets any one of the predetermined conditions, the method 40 will proceed to step 54. In step 54, the driver facing camera 12 is reenabled automatically by the driver monitoring controller 14. In one example, the driver facing camera 12 is reenabled within one hundred milliseconds of receiving the vehicle state message to ensure the capture of a driver image substantially contemporaneously with the occurrence of the vehicle state.

At any of the steps 46, 50 and 54, the operating state of the driver facing camera 12 may be recorded by the driver monitoring controller 14. The operating state of the driver facing camera 12 may also be displayed on the driver display 20 or directly on the driver facing camera 12.

Figure 3:
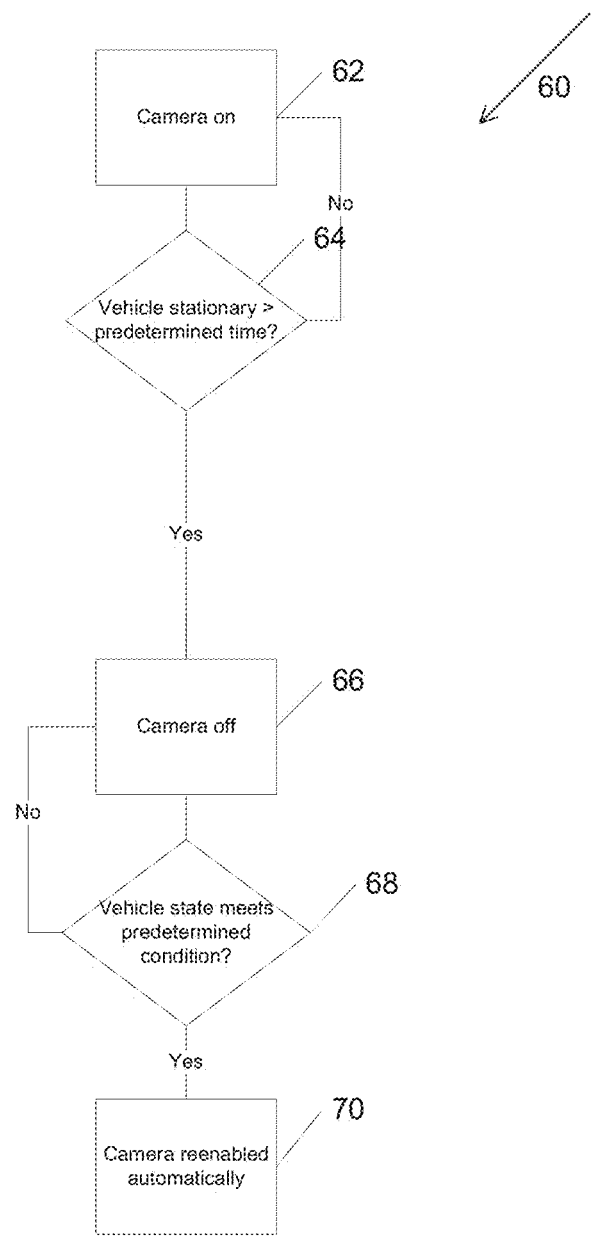
FIG. 3 illustrates another method of disabling and enabling of the driver facing camera of the driver monitoring system, according to an example of the present invention.

Another flowchart for implementing a method 60 of disabling the driver facing camera 12 is shown in FIG. 3. In step 62, the driver facing camera 12 is enabled. In one example, the driver facing camera 12 is enabled by the driver monitoring controller 14 upon power up of the vehicle.

In step 64, the driver monitoring controller 14 determines if the vehicle has been stationary greater than a predetermined period of time. This predetermined time period may be measured from the time a wheel speed message indicating the wheel speed was zero was received from the safety system controller 22 as transmitted on the vehicle communications bus 24. In one example, the predetermined time period is about fifteen minutes. In another example, the predetermined time period is about thirty minutes. If the vehicle is stationary for less than or equal to the predetermined time period, the method 60 returns to step 62 and the driver facing camera 12 remains on. The driver cannot use the manual switch 18 to turn the driver facing camera 12 off. If the vehicle has been stationary for greater than the predetermined time period, the method 60 continues to step 66.

In step 66, the driver monitoring controller 14 communicates a control message to the driver facing camera 12 via the camera bus 26 instructing the driver facing camera 14 to turn off. The driver facing camera 12 then turns off.

In step 68, the driver monitoring controller 14 determines if a vehicle message indicating that the vehicle state meets a predetermined condition has been received. The vehicle message may be from the safety system controller 22 as transmitted on the vehicle communications bus 24. The predetermined condition may be the vehicle speed above a predetermined speed, the detection of a forward object or the vehicle being out of a lane of travel. In one example, the predetermined speed is about five miles per hour. If the vehicle state does not meet any one of the predetermined conditions, the method 60 returns to step 66 and the driver facing camera 12 remains off.

If the vehicle state meets any one of the predetermined conditions, the method 60 will proceed to step 70. In step 70, the driver facing camera 12 is reenabled automatically by the driver monitoring controller 14. In one example, the driver facing camera 12 is reenabled within one hundred milliseconds of receiving the vehicle state message to ensure the capture of a driver image substantially contemporaneously with the occurrence of the vehicle state.

At either or both of the steps 62 and 66, the operating state of the driver facing camera 12 may be recorded by the driver monitoring controller 14. The operating state of the driver facing camera 12 may also be displayed on the driver display 20 or directly on the driver facing camera 12.

Therefore a method of monitoring a driver of a vehicle comprises enabling a camera for receiving images of a driver; receiving a control input indicating the driver desires to disable the camera; disabling the camera in response to a control input and a message indicating a vehicle state does not meet a predetermined condition; and re-enabling the camera automatically in response to a message indicating the vehicle state meets the predetermined condition.

Therefore a method of monitoring a driver of a vehicle comprises enabling a camera for receiving images of a driver; determining the vehicle has been stationary greater than a predetermined period of time; disabling the camera; and re-enabling the camera automatically in response to a message indicating the vehicle state meets the predetermined condition.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A driver monitoring controller for a vehicle comprising:
    A camera communications port for receiving video images of a driver and transmitting control messages to a driver facing camera;
    a vehicle communications port for receiving messages indicating a vehicle state; and
    control logic in communication with the camera communications port and the vehicle communications port, wherein the control logic disables the driver facing camera by transmitting a control message to disable the driver facing camera at the camera communications port in response to a message indicating the vehicle is stationary and the time period of the vehicle being stationary is greater than a predetermined time period wherein the predetermined time period is about 15 minutes; and wherein the control logic enables the camera automatically in response to a vehicle state message indicating the vehicle state meets the predetermined condition.

2. The driver monitoring controller as in claim 1, wherein the predetermined condition is at least one of the vehicle speed exceeding a minimum speed, a detection of a forward object, and the vehicle out of the lane of travel.

* * * * *